Figure 1:
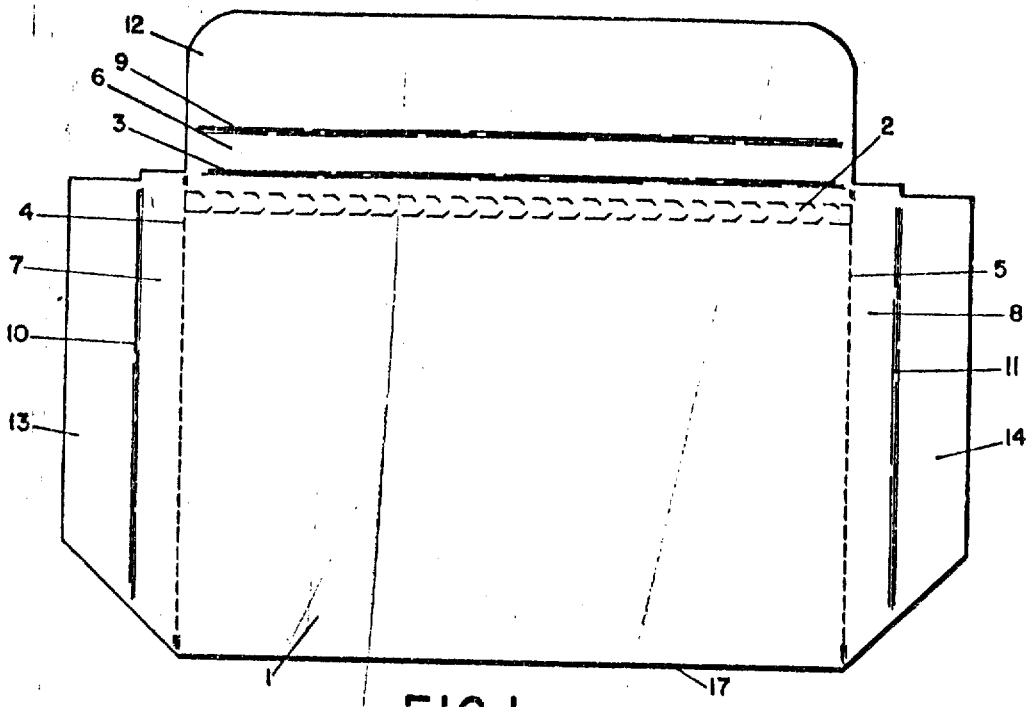
Figure 2:
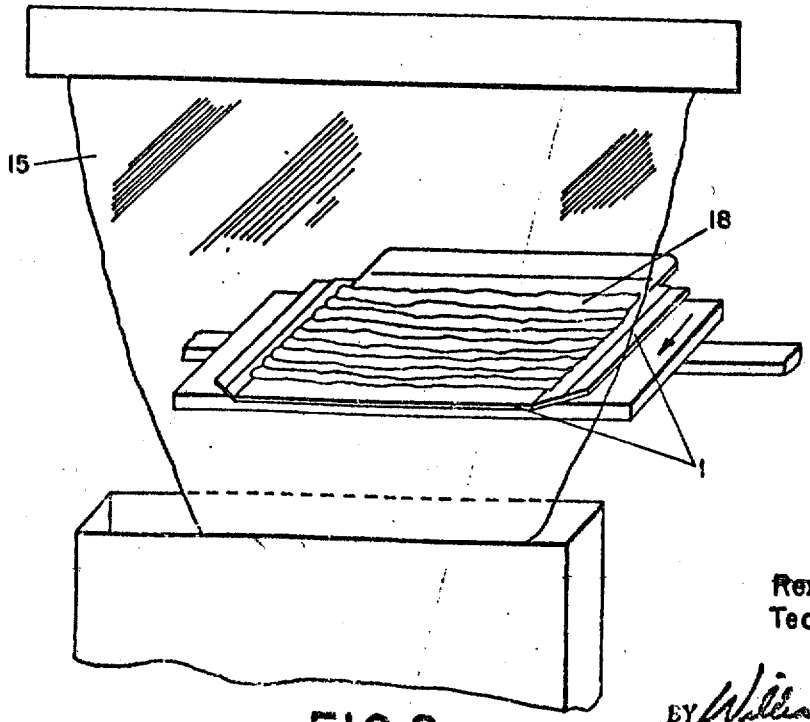

229-123.2 SR

M0292 OR T 858.015

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 21, 1969

858 O.G. 723

635,174

PACKAGE AND PROCESS USING HOT MELT CURTAIN COATING OF ARTICLES ON FOLDED SUBSTRATE

Rex Eells and Ted L. Douglas, both of P.O. Box 511, Kingsport, Tenn. 37662

Filed May 1, 1967. Published Jan. 21, 1969
Class 99—174
2 Sheets Drawing, 9 Pages Specification

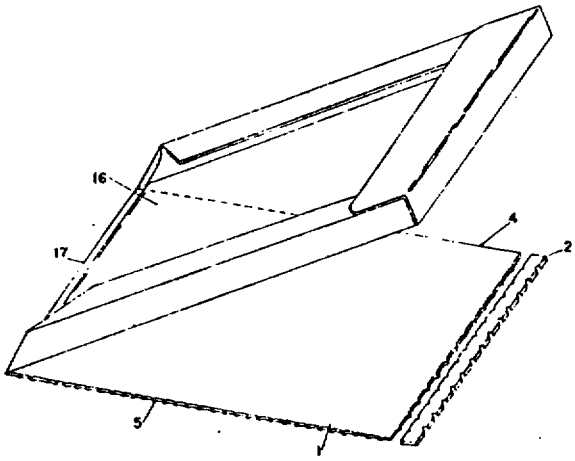

An improved packaging method and package for an article such as bacon in which the article is placed on a porous substrate having fold and weakened lines thereon, the substrate and article are then coated with a molten curtain of a thermoplastic resin, the package is folded along the fold lines on top and around the edge while the coating is still sufficiently adherent so as to retain the folded substrate in position. The folding is such that a window is formed on the top of the package through which the article can be viewed. In using the package, the substrate is torn along the perforations on three sides thereof, the folded over portion becoming a lid and the fourth untorn side of the substrate becoming a hinge in which the curtain secures the lid to the substrate supporting the article.

229-123.2 SR

M0292 OR T 858.015

Rex Eells
Ted L. Douglas
INVENTORS

BY William J. French
Charles L. Good